United States Patent Office 3,450,878
Patented June 17, 1969

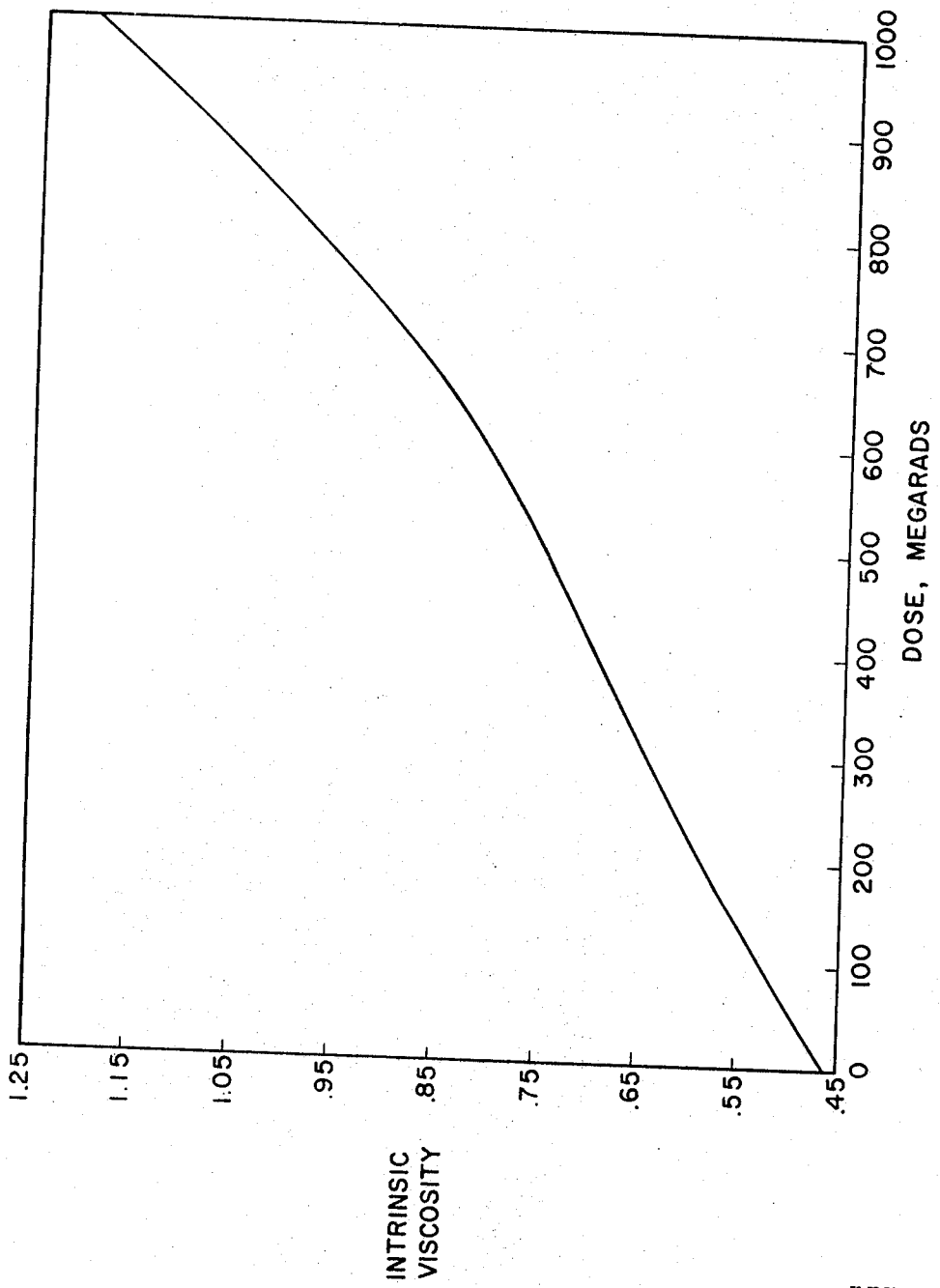

3,450,878
DOSIMETER FOR HIGH LEVELS OF ABSORBED RADIATION
George F. Pezdirtz and Vernon L. Bell, Jr., Newport News, Va., assignors to the United States of America as represented by the Administrator of the National Aeronautics and Space Administration
Filed Dec. 8, 1966, Ser. No. 600,266
Int. Cl. G01t 1/04
U.S. Cl. 250—83                                5 Claims

ABSTRACT OF THE DISCLOSURE

A dosimeter for measuring unknown radiation dosage in the range of 1–1000 megarads of absorbed radiation in which the intrinsic viscosity measurement is taken of a solution of the unknown with the unknown radiation dosage being read from a standard radiation curve plotted from known dosage/intrinsic viscosity measurements.

---

This invention was made by employees of the U.S. Government and may be manufactured or used by or for the Government without the payment of any royalties thereon or therefor.

The invention relates generally to a dosimeter and relates particularly to a novel dosimeter for easily measuring the absorbed dose of high energy ionizing radiation over a wide range of dose levels.

Previously known dosimeters have shown a limited range of utility due to an inherent susceptibility to radiation degradation of the materials used therein.

The field of high energy instrumentation is rapidly developing and the increased availability of knowledge regarding irradiation techniques such as safety limits, the penetrating ability of various rays and the effects of irradiation on various materials have resulted in widespread application of this phenomena throughout numerous industrial and experimental fields. For example, irradiation now finds application in the development of aerospace applications in determining the useful life of various materials used in the fabrication of spacecraft and the like. An aromatic polyester, poly(ethylene 2,6-naphthalenedicarboxylate) or "PEN-2,6," has been studied by industrial research organizations for fabrication into thin films and it has been found that the film properties of PEN-2,6 are practically identical with those of the well known poly(ethylene terephthalate) or "PET." Due to a lack of economic advantage of PEN-2,6 over PET films no commercialization of PEN-2,6 has at this time been undertaken. Ionizing radiation leads to a severe degradation of PET films and this somewhat limits the use thereof in space applications. In contrast to PET however, PEN-2,6 films tend to undergo crosslinking when exposed to gamma radiation from a cobalt-60 gamma radiation source and these films should prove very useful in prolonged space use. Crosslinking of thermoplastic materials leads to an increase in the average molecular weights which is readily detected by a corresponding increase in the dilute solution intrinsic viscosity. One disadvantage of the normal crosslinking reaction, however, is that the crosslinking is usually very extensive at relatively low doses, that is, under 100 megarads, so that the plastics materials generally reach a gel state and become insoluble and virtually useless for solution properties.

It has now been discovered that films of the polyester of 2,6-naphthalene dicarboxylic acid, when treated with gamma radiation from a cobalt-60 source, result in an intrinsic solution viscosity which increases substantially linear with radiation dosage over the range of 1 to approximately 1000 megarads. This is a vast improvement over the range of previous dosimeters and even a small amount of the polymer in either the film, fiber, or bulk form can be exposed to a field of intense high energy ionizing radiation. After exposure, the polymer can be dissolved in a suitable solvent, such for example trifluoro acetic acid, trifluoro acetic anhydride or orthochlorophenol to a concentration of 1% by weight. The intrinsic viscosity can then be determined using conventional techniques. By means of a standard curve this measured intrinsic viscosity may be converted as a function of radiation dosage with the total absorbed dosage being easily obtained for a given sample.

It is therefore an object of the present invention to provide a new and novel dosimeter.

Another object of the present invention is a method of determining the amount of radiation which a given unit of material has received upon being subjected to an unknown radiation dosage.

A further object of the present invention is the use of a novel crosslinking thermoplastic material in a dosimeter.

Yet another object of the present invention is a novel method of making a dosimeter.

In accordance with one aspect of the present invention the foregoing and other objects are attained by irradiating a series of identical material samples with known doses in equal increments of megarads of radiation from a standard source, dissolving each sample individually in a common solvent, measuring the intrinsic viscosity for each individually dissolved sample, translating the obtained viscosity values to a standard curve against the dose applied, as expressed in megarads, and employing this curve as a standard dosimeter for determining dosage from unknown radiation sources.

A more complete appreciation of the invention and many of the attendant advantages thereof will be readily appreciated as the same becomes better understood by reference to the following detailed description. The single drawing figure is a calibrated plot of intrinsic viscosity obtained as a function of dose for a series of material samples irradiated with incremental doses of gamma radiation from a cobalt-60 source.

Although numerous polymeric materials that undergo crosslinking reactions under the influence of high energy ionizing radiation crosslink at such a rapid rate that the materials become a gel or reach an insoluble state at a relatively low dosage of radiation, some polymeric materials undergo crosslinking at a slower and readily controllable rate. It is the latter class of polymers that are useful in the present invention. One example of this class of materials which has an intrinsic solution viscosity which is linear with dose over the range of one to about a thousand megarads is the polyester of 2,6-naphthalene dicarboxylic acid. Tests have shown that a small amount, that is, less than 1 gram, of this polymer in film, fiber or bulk form may be readily exposed to a field of intense high energy ionizing radiation, such for example, a cobalt-60 radiation source. After exposure, the polymer is dissolved in a suitable solvent such as trifluoro acetic acid, trifluoro acetic anhydride, or orthochlorophenol to a concentration of less than 1% by weight. The intrinsic solution viscosity may then be determined using an Oswald-Fenske or Ubbleholde viscometer or any other conventional viscosity measuring techniques.

Thus, in the present invention a series of samples of polyethylene 2,6-naphthalene dicarboxylate were irradiated from a cobalt-60 radiation source at incremental dosages with the range of 1 to about 1,000 megarads, the irradiated samples dissolved in a common solvent and the intrinsic viscosity of each dissolved sample measured and plotted as shown in the figure. In obtaining the radiation dosage to which a sample of polyethylene 2,6-naphthalene dicarboxylate has been subjected, when the radiation dosage is unknown, such for example as in a space flight, a sample of the material would be dissolved in the selected solvent and subsequent viscosity measurements taken of the solution. By means of the standard curve illustrated in the figure, this intrinsic viscosity is then determinable as a function of dose with the total absorbed dosage being easily read from the curve. For example, intrinsic viscosity measurement of .65 would indicate a dosage of about 300 megarads; a viscosity of .85 would indicate a dosage of about 650 megarads, etc. The solution temperature when plotting the curve and when checking the unknown would obviously be maintained essentially identical.

Although the invention has been described with reference to a conventional viscometer, it is readily apparent that the viscometer could be calibrated to read dosage directly if so desired.

Also, though the invention has been specifically described with reference to polyethylene 2,6-naphthalene dicarboxylate, it is readily apparent that other polymers exhibiting the control crosslinking phenomena may be employed to obtain other suitable standard curves for use as a dosimeter within the teachings of the present invention.

Obviously, there are numerous modifications and variations of the present invention possible in the light of the above teachings. It is therefore to be understood that within this scope of the claims that the invention may be practiced otherwise than as specifically described.

What is claimed as new and desired to be secured by Letters Patent of the United States is:

1. A method of making a dosimeter for measuring the absorbed dose of high energy ionizing radiation over a wide range of dose levels of from 1 to approximately 1000 megarads comprising the steps of:
   irradiating a series of identical polymer samples with known doses in equal increments of megarads of radiation from a standard source,
   dissolving each of said samples individually in a common solvent, said polymer when dissolved having the inherent physical property characteristic of increasing in viscosity substantially linear with radiation dosage over the range of 1 to approximately 1000 megarads,
   measuring the intrinsic viscosity of each individual dissolved sample,
   translating the obtained viscosity values to a standard curve against the dose expressed in megarads; and
   employing said curve as a standard dosimeter for determining dose from unknown radiation sources.

2. A method of determining the amount of radiation which a given unit of material has received upon being subjected to an unknown radiation dose comprising:
   irradiating a plurality of material samples with known doses in equal increments of from 1 to 1,000 megarads,
   dissolving each of said samples into separate quantities of a common material solvent, said material when dissolved having the inherent physical property characteristic of increasing in viscosity substantially linear with radiation dosage over the range of 1 to approximately 1,000 megarads,
   measuring the intrinsic viscosity of each said sample containing solvent,
   plotting said viscosity values against the sample dosage received to obtain a standard curve, dissolving said given unit of material in a quantity of said material solvent,
   measuring the intrinsic viscosity of said dissolved given unit, and
   employing said curve to determine the dosage to which said given unit has been subjected.

3. The method of claim 2 wherein said material is a polymer having the inherent physical property characteristics of undergoing crosslinking reactions under the influence of high energy ionizing radiation.

4. The method of claim 2 wherein said material is the polyester of 2,6-naphthalene dicarboxylic acid.

5. The method of claim 4 wherein said common solvent is selected from the group consisting of trifluoro acetic acid, trifluoro acetic anhydride, and orthochlorophenol.

References Cited

UNITED STATES PATENTS 3,226,545   12/1965   Potsaid.

OTHER REFERENCES

The Degradation of Solid Polymethylmethacrylate by Ionizing Radiation, by Alexander et al., from Royal Society of London Proceedings, vol. 223, 1954, pp. 392–404.

ARCHIE R. BORCHELT, *Primary Examiner.*